J. G. MOOMY.
PATCH FOR RUBBER ARTICLES AND PROCESS OF MANUFACTURE.
APPLICATION FILED SEPT. 4, 1913.
1,111,804.
Patented Sept. 29, 1914.
2 SHEETS—SHEET 1.
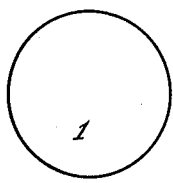    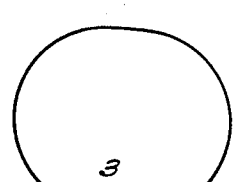 
Fig. 1.  Fig. 2.    Fig. 3.  Fig. 4.    Fig. 5.  Fig. 6.
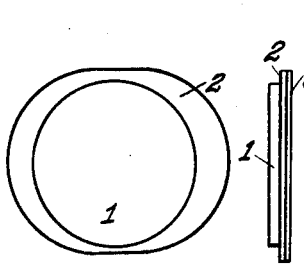 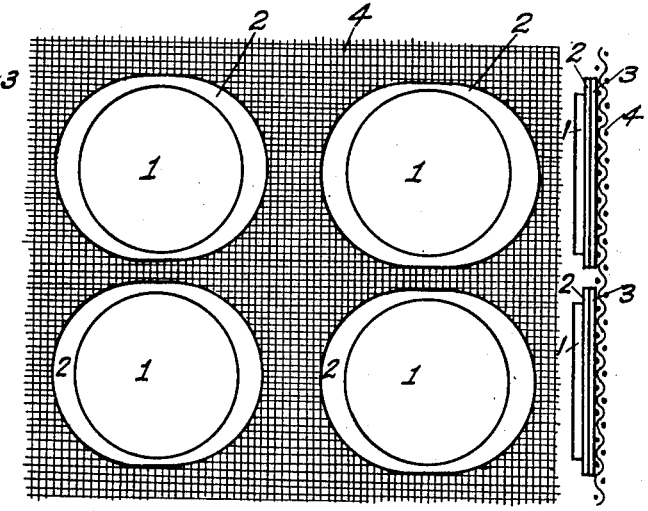
Fig. 7.  Fig. 8.
Fig. 9.    Fig. 10.
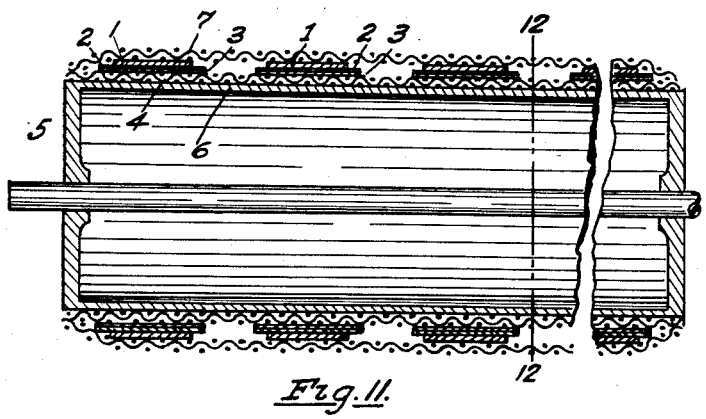 
Fig. 11.    Fig. 12.
Witnesses
Inventor
Joseph G Moomy
Attorney J. G. MOOMY.
PATCH FOR RUBBER ARTICLES AND PROCESS OF MANUFACTURE.
APPLICATION FILED SEPT. 4, 1913.

1,111,804.

Patented Sept. 29, 1914.

2 SHEETS—SHEET 2.

Witnesses
B. M. Hartman
S. C. Hess

Inventor
Joseph G. Moomy
by N. C. Lind
Attorney

UNITED STATES PATENT OFFICE.

JOSEPH G. MOOMY, OF ERIE, PENNSYLVANIA.

PATCH FOR RUBBER ARTICLES AND PROCESS OF MANUFACTURE.

1,111,804.  Specification of Letters Patent.  Patented Sept. 29, 1914.

Application filed September 4, 1913. Serial No. 788,116.

*To all whom it may concern:*

Be it known that I, JOSEPH G. MOOMY, a citizen of the United States, residing at Erie, in the county of Erie and State of Pennsylvania, have invented new and useful Improvements in Patches for Rubber Articles and Processes of Manufacture, of which the following is a specification.

This invention relates to patches for rubber articles and consists in certain improvements in construction thereof as will be hereinafter fully described and pointed out in the claims.

More particularly the invention relates to patches which are especially designed for repairing pneumatic tires and similar articles.

In my Patent 1,068,691 dated July 29, 1913, I have shown and described a rubber patch having one surface raw rubber and the other vulcanized rubber. This invention relates to the type of patch there shown. It is desirable with such a patch to have the face of raw rubber extend to the extreme edge of the patch so as to assure the firm adhesion of the patch at such edge. It is also desirable to have the opposite surface of the patch sufficiently vulcanized to prevent its ready adhesion to other surfaces and to have the patch taper off to a feather edge so that the edge itself, when the patch is in place, presents no wall or surface which will readily engage with any obstruction so as to loosen the patch. Where one surface of the patch is formed of raw rubber it is desirable to exclude the air from this until the patch is used so as to obtain the adhesive quality of the surface. With the present invention, these desirable qualities are obtained.

Figure 13:
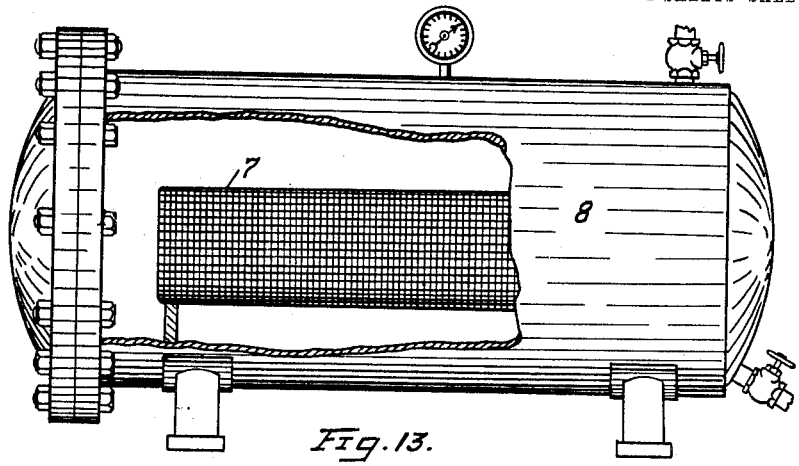
Figures 14, 15:
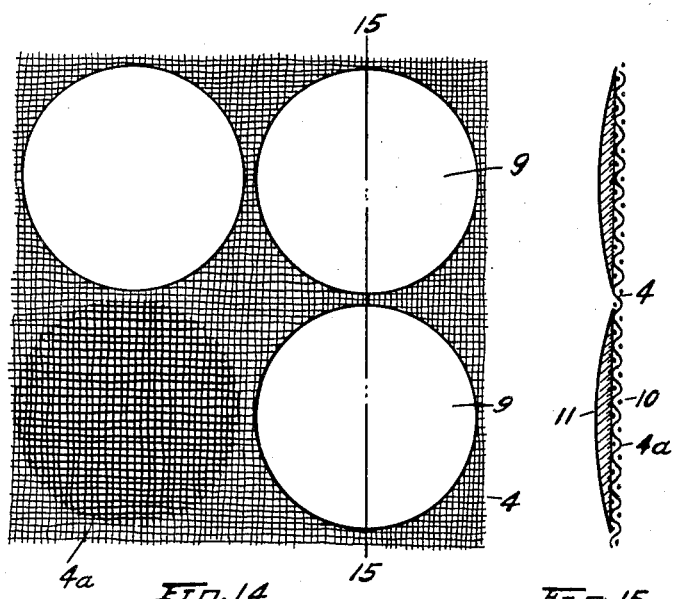

This invention is illustrated in the accompanying drawing as follows:

Figure 1 shows a plan view of one layer of material used in completing the patch, this layer being formed of vulcanizing stock. Fig. 2 is a side elevation of the same. Fig. 3 is a plan view of a layer of vulcanizing stock somewhat larger than that of Fig. 1. Fig. 4 is a side elevation of the same. Fig. 5 is a plan view of a layer of non-vulcanizing stock. Fig. 6 is a side elevation of the same. Fig. 7 shows a plan view of the associated layers forming the patch. Fig. 8 is a side elevation of same. Fig. 9 is a plan view of the fabric with the associated layers for forming patches on same ready for vulcanizing. Fig. 10 is a side elevation of the parts as shown in Fig. 9. Fig. 11 is a longitudinal section of the drum on which the patches are vulcanized. Fig. 12 is a section on the line 12—12 of Fig. 11. Fig. 13 is a vulcanizing drum in place in the vulcanizing chamber. Fig. 14 is a plan view of the completed patches, one of the patches being removed from the muslin, and Fig. 15 is a section on the line 15—15 in Fig. 14.

The layers 1 and 2 are of vulcanizing stock, that is, the rubber is combined with material which will effect vulcanization under heat. The layer 3 is of non vulcanizing stock, that is, it has no compound for effecting vulcanization. After the different layers are associated as in Fig. 8 they are placed on a fabric 4 as shown in Fig. 9. This fabric is preferably glazed fabric, ordinarily glazed muslin.

After the patches are placed on the muslin 4 they are wrapped on a drum 5, said drum having an imperforate surface 6, ordinarily galvanized iron. The glazed muslin is placed next the surface 6 and the patches are put under pressure by winding a muslin strip 7 around the drum and over the patches. Ordinarily this muslin strip is a long narrow strip which is wrapped around and around the drum, the edge of each wrapping overlapping the preceding wrapping. This is the ordinary method of wrapping articles where it is desired to hold them under pressure during vulcanization. The drum having the muslin with the patches mounted on it is then placed in the vulcanizing heater as shown in Fig. 13, and steam is turned into the vulcanizer in the ordinary manner.

If a glazed fabric 4 is used and this is put on a drum having an imperforate surface 6, the glazed fabric in connection with the surface and the superimposed patch being vulcanized forms a seal which excludes the moisture from that part of the muslin between the raw patch and the imperforate surface. The result is that the non vulcanizing stock does not penetrate the muslin sufficiently to prevent its ready removal from the muslin and at the same time the steam cannot penetrate the muslin sufficiently to soften the glaze. When the vulcanization is completed, this glazed muslin forms an air seal for the raw surface of the patch so as to retain the freshness of the surface for considerable periods of time.

In Fig. 14 I have shown a part of the muslin 4ᵃ which has thus been sealed from the moisture and thus has retained its glazed surface, the glazed surface having the desirable effect just hereinbefore described. In the exposed parts of the muslin the glaze is removed through the action of the steam in the vulcanizing process.

In the vulcanizing process the layer 1 of vulcanizing stock and the edges of the layers 2 and 3 under the influence of the wrapping of muslin form a beveled surface such as is shown in Fig. 15. The important feature of this is at the edge. The layers 2 and 3 are preferably coextensive. When placed on the muslin under the pressure of wrapping and subjected to heat, the edges of these layers flow outwardly slightly thus thinning the edges to a feather edge, the non vulcanizing stock being slightly softer, assures its flowing to the extreme edge and at the same time there is sufficient vulcanizing material carried to the edge so that the back surface of this extreme edge is sufficiently vulcanized to prevent its readily adhering. In the finished patch, therefore, the non vulcanizing portion and the vulcanizing portion at the extreme edge of the patch is thinner than the interior or body portion of the patch. With this method of manufacture, however, there is no clear line of demarcation between the non vulcanized material and the vulcanized material, the vulcanizing agent in the vulcanizing layer penetrating slightly the non vulcanizing layer so that there is a complete union of parts forming the patch with a raw surface which will readily adhere to rubber articles with simply an application of gasolene only and an outer vulcanized surface which will not readily adhere to rubber articles.

What I claim as new is:—

1. A patch for rubber articles having one face raw rubber and the opposite face vulcanized rubber formed by vulcanizing a layer of vulcanizing stock in contact with a layer of non vulcanizing stock, the raw rubber and vulcanizing rubber portions of the patch being thinner at the edge than in the body of the patch.

2. The method or process of forming patches for rubber articles which consists in forming a layer of raw rubber and a layer of stock compounded to vulcanize under heat and approximating the size of the layer of raw rubber; a second layer of stock compounded to vulcanize under heat arranged on the first layer of vulcanizing stock, said second layer being of smaller dimensions than the first layer; placing the three layers together face to face with the two layers of vulcanizing stock in contact and the layer of raw rubber on the larger layer of vulcanizing stock; and vulcanizing and uniting the associated layers by heat while subjecting the layers to pressure to form a patch having one surface vulcanized rubber and the other surface raw rubber with the edges of said patch beveled, the non vulcanized surface extending to the extreme edge of the patch.

3. A patch for rubber articles having one face raw rubber and the opposite face vulcanized rubber formed by vulcanizing a layer of vulcanizing stock in contact with a layer of non vulcanizing stock, the raw rubber and vulcanizing portions of the patch forming a feather edge.

4. A patch for rubber articles having one face raw rubber and the opposite face vulcanized rubber and formed by vulcanizing a layer of vulcanizing stock in contact with a layer of non vulcanizing stock and an air proofing for the raw surface of the patch.

5. A patch for rubber articles having one face raw rubber and the opposite face vulcanized rubber and formed by vulcanizing a layer of vulcanizing stock in contact with a layer of non vulcanizing stock and air proofing for the raw surface of the patch, said air proofing comprising a fabric to which the raw surface is secured as the patch is vulcanized.

6. A patch for rubber articles having one face raw rubber and the opposite face vulcanized rubber and formed by vulcanizing a layer of vulcanizing stock in contact with a layer of non vulcanizing stock and air proofing for the raw surface of the patch, said air proofing comprising a glazed fabric to which the raw surface is secured as the patch is vulcanized.

In testimony whereof I have hereunto set my hand in the presence of two subscribing witnesses.

JOSEPH G. MOOMY.

Witnesses:
B. M. HARTMAN,
V. C. HESS.